(12) United States Patent
Kitayabu (10) Patent No.: US 8,244,202 B2
(45) Date of Patent: Aug. 14, 2012

(54) MULTIBAND RF RECEIVER AND METHOD FOR RECEIVING MULTIBAND RF SIGNAL

(75) Inventor: Toru Kitayabu, Saitama (JP)

(73) Assignee: KDDI Corporation, Tokyo (JP)

( * ) Notice: Subject to any disclaimer, the term of this patent is extended or adjusted under 35 U.S.C. 154(b) by 457 days.

(21) Appl. No.: 12/493,530

(22) Filed: Jun. 29, 2009

(65) Prior Publication Data

US 2009/0325520 A1 Dec. 31, 2009

(30) Foreign Application Priority Data

Jun. 30, 2008 (JP) ................................. 2008-171314

(51) Int. Cl.
*H04B 1/16* (2006.01)

(52) U.S. Cl. ........ 455/344; 455/296; 455/302; 375/339; 375/344

(58) Field of Classification Search .................. 455/424, 455/425, 456.5, 456.6, 561, 550.1, 575.1, 455/522, 302, 552, 103, 334, 260, 296, 77, 455/323, 307, 266; 375/266, 343, 316, 344, 375/339; 370/478, 316

See application file for complete search history.

(56) References Cited

U.S. PATENT DOCUMENTS

| | | | | |
|---|---|---|---|---|
| 6,549,766 B2 * | 4/2003 | Vorenkamp et al. | ........... | 455/307 |
| 6,683,919 B1 * | 1/2004 | Olgaard et al. | ............... | 375/316 |
| 6,724,440 B1 * | 4/2004 | Suan et al. | .................... | 348/731 |
| 6,785,527 B2 * | 8/2004 | Earls | .............................. | 455/323 |
| 6,980,609 B1 * | 12/2005 | Ahn | .............................. | 375/343 |
| 6,993,356 B2 * | 1/2006 | Herzinger | ..................... | 455/522 |
| 7,746,922 B2 * | 6/2010 | Gehring et al. | ............... | 375/226 |
| 7,787,829 B1 * | 8/2010 | Wright | ............................. | 455/77 |
| 2002/0081988 A1 * | 6/2002 | Parker | ........................... | 455/296 |
| 2002/0173337 A1 * | 11/2002 | Hajimiri et al. | ............... | 455/552 |
| 2004/0014435 A1 * | 1/2004 | Woo et al. | ..................... | 455/103 |
| 2004/0102172 A1 * | 5/2004 | Hendin | ......................... | 455/302 |
| 2005/0156675 A1 * | 7/2005 | Rohde et al. | .................... | 331/16 |
| 2005/0275479 A1 * | 12/2005 | Sutton | .......................... | 331/154 |

(Continued)

FOREIGN PATENT DOCUMENTS

JP 8-162990 A 6/1996

(Continued)

OTHER PUBLICATIONS

D. M. Akos et al., "Direct Bandpass Sampling of Multiple Distinct RF Signals", IEEE Transactions on Communications, Jul. 1999, pp. 983-988, vol. 47, No. 7.

(Continued)

*Primary Examiner* — Duc Nguyen
*Assistant Examiner* — Charles Chow
(74) *Attorney, Agent, or Firm* — Westerman, Hattori, Daniels & Adrian, LLP (57) ABSTRACT

A multiband receiver is disclosed for receiving a multiband RF signal having first and second RF bands. The first RF band contains a first service RF range, and the second RF band contains a second service RF range. The receiver includes a mixer for converting the RF signal into an IF signal, using a single local oscillator frequency "f," and an IF bandpass filter for canceling out some of frequencies of the IF signal outside of a predetermined passband. The local oscillator frequency "f" is determined to allow the first and second service IF ranges to lie outside of the predetermined passband, and to allow a frequency portion of the first IF band exclusive of the first service IF range and a frequency portion of the second IF band exclusive of the second service IF range to lie within the predetermined passband.

13 Claims, 7 Drawing Sheets

U.S. PATENT DOCUMENTS

| | | | |
|---|---|---|---|
| 2006/0057996 A1* | 3/2006 | Petrovic et al. | 455/260 |
| 2007/0037546 A1* | 2/2007 | Steed et al. | 455/334 |
| 2007/0130605 A1* | 6/2007 | Chung | 725/131 |
| 2010/0080270 A1* | 4/2010 | Chen et al. | 375/219 |

FOREIGN PATENT DOCUMENTS

| | | |
|---|---|---|
| JP | 2000-332726 A | 11/2000 |
| JP | 2001-274714 A | 10/2001 |
| JP | 2006-339868 A | 12/2006 |
| JP | 2008-511260 A | 4/2008 |
| WO | 2006/026249 A2 | 3/2006 |
| WO | 2006/070642 A1 | 7/2006 |

OTHER PUBLICATIONS

C. Tseng et al., "Direct Downconversion of Multiband RF Signals Using Bandpass Sampling", IEEE Transactions on Communications, Jan. 2006, pp. 72-76, vol. 5, No. 1.

Notice of Reasons for Rejection dated Aug. 25, 2011, issued in corresponding Japanese Patent Application No. 2008-171314.(w/ partial English translation).

Japanese Office Action dated May 7, 2012, issued in the corresponding Japanese Patent Application No. 2008-171314 with an English translation.

* cited by examiner

MULTIBAND RF RECEIVER AND METHOD FOR RECEIVING MULTIBAND RF SIGNAL

CROSS-REFERENCE TO RELATED APPLICATIONS

The present application is based on and claims the benefit of priority from Japanese Patent Application No. 2008-171314 filed Jun. 30, 2008, the content of which is incorporated herein by reference in its entirety.

BACKGROUND OF THE INVENTION

1. Field of the Invention

The invention relates generally to a multiband RF receiver and a method for receiving a multiband RF signal, and more particularly to techniques of converting frequencies of the multiband RF signal.

2. Description of the Related Art

There is known a receiver for receiving through at least one antenna a multiband radio frequency (RF) signal having distinct RF bands.

Figure 1:
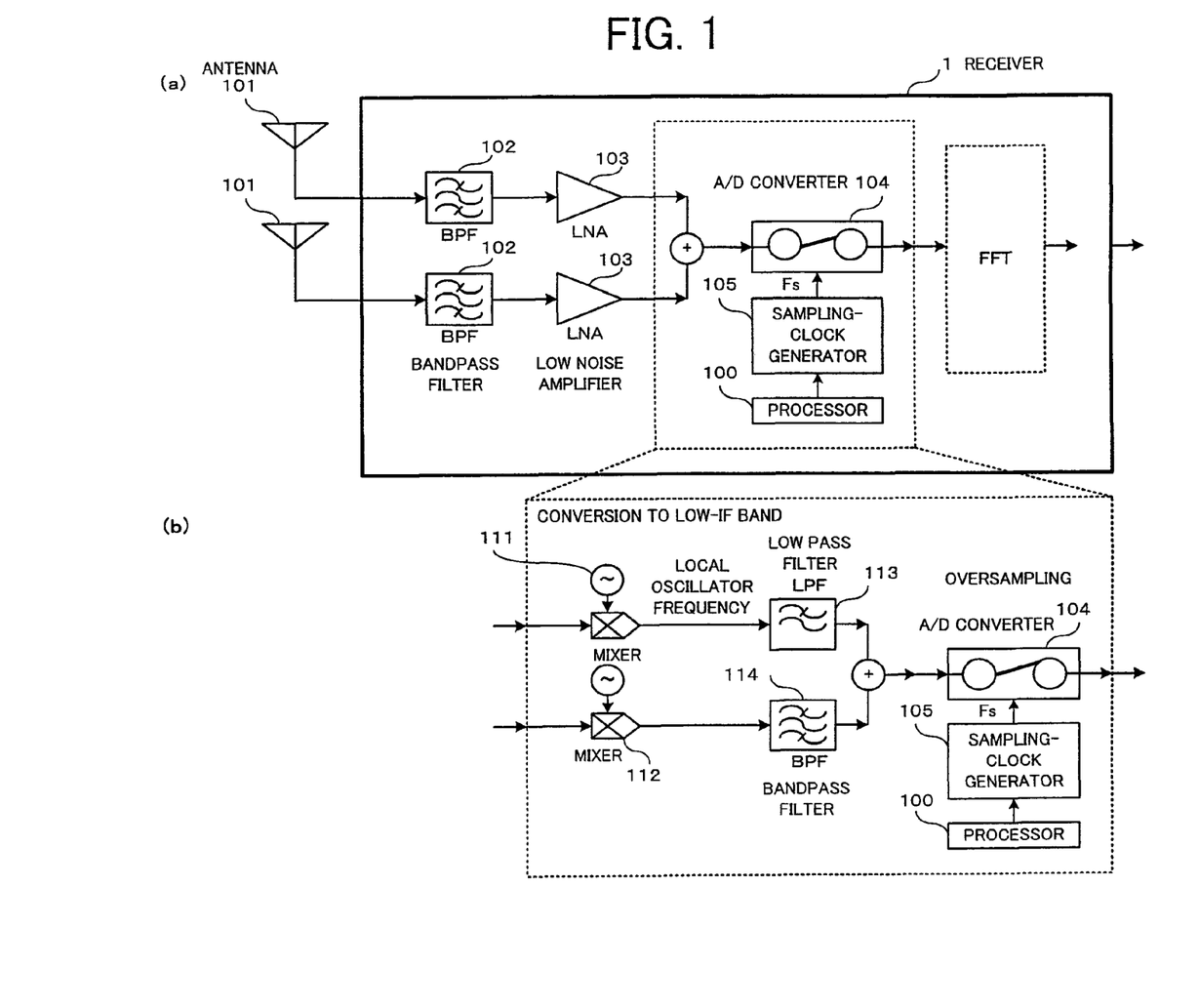
FIGS. 1(a) and 1(b) are functional block diagrams illustrative of two implementations of a conventional multiband RF receiver, respectively.

FIGS. 1(a) and 1(b) illustrate two implementations of a conventional multiband receiver in functional block diagram, respectively.

Referring first to FIG. 1(a), a receiver 1 is illustrated in which two system bands (e.g., frequency bands licensed and allocated to carriers) are simultaneously sampled, as disclosed in, for example, Japanese Patent Application Publication No. 2001-274714.

In the receiver 1, radio frequency (RF) signals, upon reception at two antennas 101 and 101, enter bandpass filters (BPFs) 102 and 102 for respective system bands, to cancel out undesired frequency components.

Those two signals are next amplified by low noise amplifiers (LNAs) 103 and 103, respectively. The thus-amplified two signals are combined with each other at an adder into a composite signal, and this composite signal enters an analog-digital converter (A/D converter) 104.

The A/D converter 104 performs simultaneous frequency-conversion of the received signal by undersampling at a common sampling frequency Fs. The sampling frequency Fs is generated from a sampling-clock generator 105.

The sampling frequency Fs is selected by the direction of a processor (i.e., a CPU) 100 so as to successfully prevent interference between spectral replicas of all desired signals (e.g., channel signals) within each system band. The replicas are produced by the undersampling.

As a result, the A/D converter 104 outputs a low intermediate frequency (Low-IF) signal. In some cases, this Low-IF signal is demodulated by, for example, Fast Fourier Transform (FFT).

Referring next to FIG. 1(b), another implementation of a conventional receiver is illustrated within a dashed box.

In this implementation, two distinct RF bands, upon amplification at respective LNAs 103 and 103, enter respective mixers 112 and 112 to convert those two RF bands (i.e., native bands) into respective low-intermediate-frequency (Low-IF) bands.

Each mixer 112, 112 converts each native RF band to each Low-IF band whose frequency is lowered depending on each local oscillator frequency produced from each local oscillator 111, 111. The local oscillator frequencies for these two local oscillators 111 and 111 are determined, on a desired-signal by desired-signal basis, to be mutually different enough to prevent interference between desired signals (e.g., channel signals) within each system band.

These two IF band signals, after filtered, are combined with each other at an adder into a composite signal, and the composite signal having distinct IF bands is simultaneously oversampled by the A/D converter 104.

In this regard, the term "undersampling" is used to mean a process of sampling a received signal at a frequency lower than a Nyquist frequency, to thereby achieve intentional aliasing, ultimately for converting a high frequency carrier wave into a low frequency wave, as disclosed in, for example, "Direct Bandpass Sampling of Multiple Distinct RF Signals," co-authored by Dennis M. Akos, Michael Stockmaster, James B. Y. Tsui, and Joe Caschera, IEEE Transactions on communications, Vol. 47, No. 7, July 1999, pp. 983-988. This document is incorporated herein by reference in its entirety.

This process, owing to its lower sampling frequency, can make a receiver available with a relatively low ability of processing, while requiring a noise reduction filter with high performance because of the need to eliminate effects of folding noise.

In contrast, the term "oversampling" is used to mean a process of sampling a received signal at a frequency higher than a Nyquist frequency. This process, owing to its higher sampling frequency, enables a filter for noise reduction to be designed with ease, while requiring a receiver with high performance.

There is also known an alternative technique of sampling simultaneously-received distinct RF signals by undersampling at a sampling frequency, and of defining a range of sampling frequencies that prevents interference between those RF signals, upon sampled, as disclosed in, for example, "Direct Downconversion of Multiband RF Signals Using Bandpass Sampling," co-authored by Ching-Hsiang Tseng and Sun-Chung Chou, IEEE Transactions on Wireless Communications, Vol. 5, No. 1, January 2006, pp. 72-76. This document is incorporated herein by reference in its entirety.

More specifically, this technique is practiced in a manner that each actual case for calculating an acceptable sampling frequency is classified as one of pre-assumed groups, according to the frequency of folding frequency location resulting from the sampling of each RF signal, and that the acceptable sampling frequency is calculated from both the undersampling factor and the frequency of each RF signal.

Figure 2:
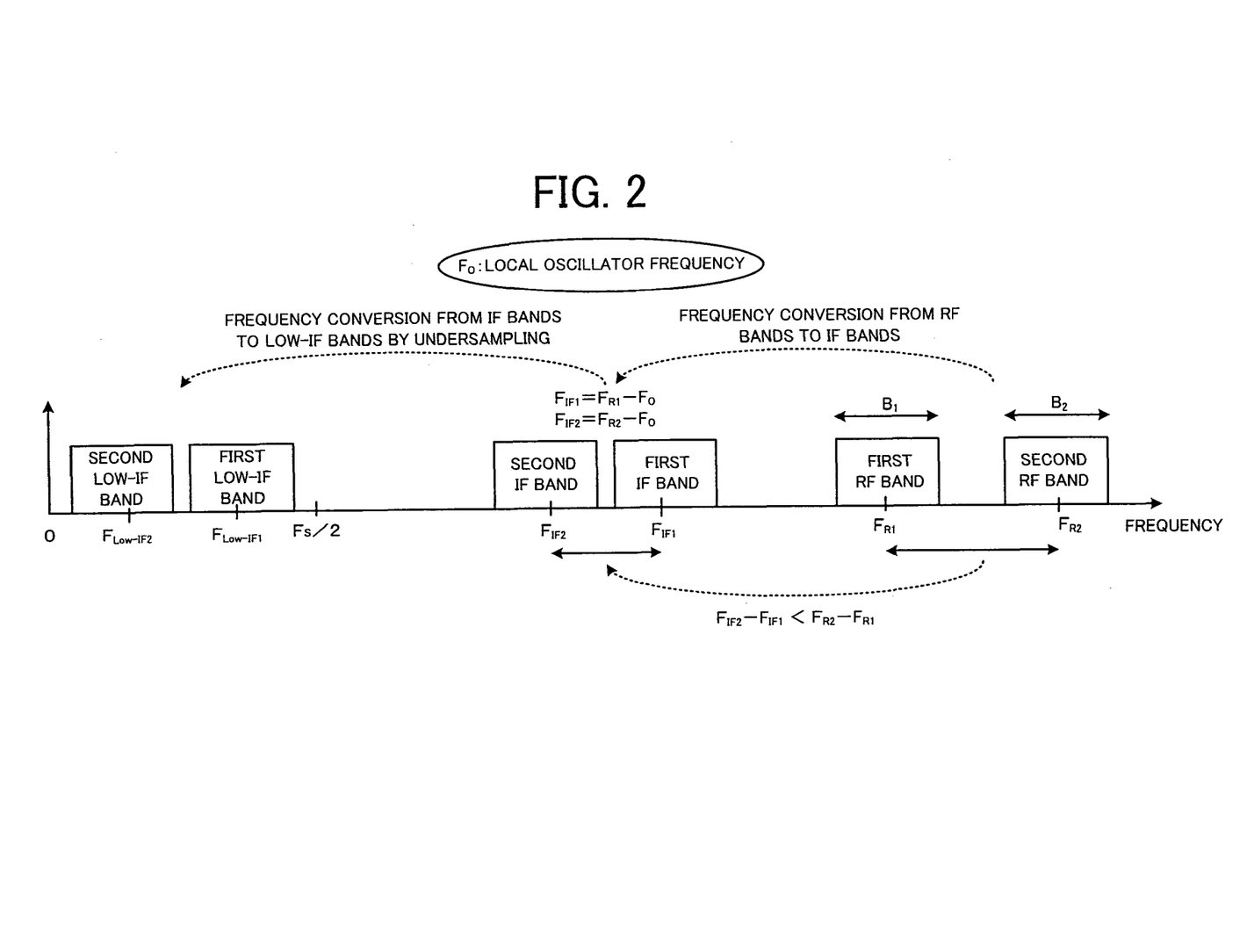
FIG. 2 is a wave form chart for explanation of frequency conversion from an RF signal to an IF signal, and subsequent frequency conversion from the IF signal to a Low-IF signal.

Referring next to FIG. 2, a wave form chart is illustrated for explanation of frequency conversion from an RF signal to an IF signal, and subsequent frequency conversion from the IF signal to a Low-IF signal.

As illustrated in FIG. 2, first and second RF bands lie in a higher-frequency region.

First, these first and second RF bands are converted into first and second IF bands, as conceptually expressed with the following formula based on a single local oscillator frequency $F_0$:

$$F_{IF1} = F_{R1} - F_0, \text{ and}$$

$$F_{IF2} = F_{R2} - F_0,$$

where $F_{IF1}$: center frequency of first IF band,
$F_{IF2}$: center frequency of second IF band,
$F_{R1}$: center frequency of first RF band,
$F_{R2}$: center frequency of second RF band, and
$F_0$: single local oscillator frequency.

Next, these first and second IF bands are simultaneously undersampled at an undersampling frequency Fs. These first and second IF bands, as a result of repeated aliasing by the undersampling, are converted into Low-IF bands located not higher than Fs/2.

BRIEF SUMMARY OF THE INVENTION

In recent years, it has been becoming more and more difficult for telecommunications operators to acquire a continuous wider frequency range for providing voice and data communications services so as to meet the need to transmit/receive a larger amount of data.

On the other hand, for example, existing cellular-communications-services are provided in system bands (e.g., frequency bands licensed and allocated to carriers) including 800 MHz band, 1.5 GHz band and 2 GHz band, by the use of channels in an operating condition (e.g., use/non-use condition) which varies between geographical local areas.

In some cases, a system band contains an unused or unengaged frequency portion (i.e., a frequency portion which is available but not yet actually used) in addition to a used frequency portion, that is, an existing service range (i.e., a frequency range which is allocated for service and lies within a system band, and which can be referred to also as "service sub-band").

In some cases, users' shift from an existing system (i.e., the type of communication) to a new system of communication results in a decrease in the total number of terminals that each existing service range can simultaneously accommodate. This decrease may create an unused or unengaged frequency portion within a system band that the existing service range belongs to.

In view of the foregoing, it would be desirable to use even unused frequency portions within existing service bands, in order to meet the need to transmit/receive a larger amount of data.

According to some aspects of the invention, there is provided a multiband receiver for receiving through at least one antenna a multiband radio frequency (RF) signal having first and second RF bands which are distinct.

The first RF band contains high and low frequency portions, and the second RF band contains high and low frequency portions.

The first RF band contains a first existing service RF range in a selected one of the high and low frequency portions of the first RF band, and the second RF band contains a second existing service RF range in a selected one of the high and low frequency portions of the second RF band.

The receiver comprises:

a mixer for converting the RF signal into an intermediate frequency (IF) signal, using a single local oscillator frequency "f" produced from a single local oscillator; and an IF bandpass filter for canceling out frequencies of the IF signal outside of a predetermined passband of the IF bandpass filter.

The IF signal contains a first IF band corresponding to the first RF band, and a second IF band corresponding to the second RF band.

The first IF band contains a first existing service IF range corresponding to the first existing service RF range.

The second IF band contains a second existing service IF range corresponding to the second existing service RF range.

The local oscillator frequency "f" is determined to allow the first and second existing service IF ranges to lie outside of the predetermined passband of the IF bandpass filter, and to allow a frequency portion of the first IF band exclusive of the first existing service IF range and a frequency portion of the second IF band exclusive of the second existing service IF range to lie within the predetermined passband of the IF bandpass filter.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

According to a first aspect of the invention, there is provided a receiver for receiving through at least one antenna a multiband radio frequency (RF) signal having first and second RF bands which are distinct, wherein the first RF band contains high and low frequency portions, and the second RF band contains high and low frequency portions, and the first RF band contains a first existing service RF range in a selected one of the high and low frequency portions of the first RF band, and the second RF band contains a second existing service RF range in a selected one of the high and low frequency portions of the second RF band, the receiver comprising:

a mixer for converting the RF signal into an intermediate frequency (IF) signal, using a single local oscillator frequency "f" produced from a single local oscillator;

an IF bandpass filter for canceling out frequencies of the IF signal outside of a predetermined passband of the IF bandpass filter; and an analog-to-digital (A/D) converter for converting the IF signal which has passed through the IF bandpass filter, into a Low-IF signal produced by simultaneous sampling of the IF signal at a single sampling frequency, wherein the IF signal contains a first IF band corresponding to the first RF band, and a second IF band corresponding to the second RF band, the first IF band contains a first existing service IF range corresponding to the first existing service RF range, the second IF band contains a second existing service IF range corresponding to the second existing service RF range, and the local oscillator frequency "f" is determined to allow the first and second existing service IF ranges to lie outside of the predetermined passband of the IF bandpass filter, and to allow a frequency portion of the first IF band exclusive of the first existing service IF range and a frequency portion of the second IF band exclusive of the second existing service IF range to lie within the predetermined passband of the IF bandpass filter.

As stated above, it would be desirable to use even unused frequency portions within existing system bands, in order to meet the need to transmit/receive a larger amount of data.

To this end, an approach is preferably taken to a set of a plurality of distinct existing system bands (e.g., frequency bands licensed and allocated to carriers), for simultaneous selection of unused frequency portions of these existing system bands in combination, for the purposes of a new communication service.

This approach, however, requires a conventional receiver to use specific-purpose circuits for respective existing system bands, with a risk of circuit size increasing.

Further, because the same system band is a mixture of an existing service range and a new service range (allocated to an unused frequency portion of the system band), this approach is risky of signal interference between these different service ranges.

The above-mentioned Japanese Patent Application Publication No. 2001-274714 discloses a receiver in which two RF bands are frequency-converted using a single local oscillator frequency, with the receiver equipped with an IF bandpass filter.

This IF bandpass filter is provided to select only a predetermined frequency band, without considering the presence of a plurality of distinct system bands, without any resulting action to prevent signal interference between an existing service range and a new service range.

In contrast, the receiver according to the first aspect of the invention operates in a manner that a multiband RF signal is simultaneously converted into a multiband IF signal, using a single local oscillator frequency "f," that some of frequencies of the IF signal outside of a predetermined passband are canceled out, and that the local oscillator frequency "f" is determined to allow existing service IF ranges (i.e., used frequency portions of IF bands within the multiband IF signal) to lie outside of the predetermined passband, and to allow frequency portions of the IF bands exclusive of the existing service IF ranges (i.e., unused frequency portions of the IF bands) to lie within the predetermined passband.

As a result, the IF bandpass filter's action of canceling out some of the frequencies of the IF signal outside of the predetermined passband allows only the unused frequency portions to be selected or extracted from the IF bands, without interference with the used frequency portions, that is, the existing service ranges.

Therefore, this receiver would allow simultaneous reception and combining of unused frequency portions within a plurality of distinct system bands (i.e., frequency portions of system bands which are exclusive of used frequency portions or existing service ranges), without any risk of signal interference between an existing service range and an unused frequency portion (i.e., a new service range).

According to a second aspect of the invention, there is provided a method for converting frequencies of a multiband radio frequency (RF) signal having first and second RF bands which are distinct, operable in a receiver for receiving the RF signal through at least one antenna, wherein the first RF band contains high and low frequency portions, and the second RF band contains high and low frequency portions, and the first RF band contains a first existing service RF range in a selected one of the high and low frequency portions of the first RF band, and the second RF band contains a second existing service RF range in a selected one of the high and low frequency portions of the second RF band, the method comprising the steps of:

converting the RF signal into an intermediate frequency (IF) signal, using a single local oscillator frequency "f" produced from a single local oscillator;

canceling out frequencies of the IF signal outside of a predetermined passband of an IF bandpass filter; and converting the IF signal which has passed through the IF bandpass filter, into a Low-IF signal produced by simultaneous sampling of the IF signal at a single sampling frequency, wherein the IF signal contains a first IF band corresponding to the first RF band, and a second IF band corresponding to the second RF band, the first IF band contains a first existing service IF range corresponding to the first existing service RF range, the second IF band contains a second existing service IF range corresponding to the second existing service RF range, and the local oscillator frequency "f" is determined to allow the first and second existing service IF ranges to lie outside of the predetermined passband of the IF bandpass filter, and to allow a frequency portion of the first IF band exclusive of the first existing service IF range and a frequency portion of the second IF band exclusive of the second existing service IF range to lie within the predetermined passband of the IF bandpass filter.

According to a third aspect of the invention, there is provided a computer-readable medium having stored therein a program which, when executed by a computer, controls a receiver for receiving through at least one antenna a multiband radio frequency (RF) signal having first and second RF bands which are distinct, wherein the first RF band contains high and low frequency portions, and the second RF band contains high and low frequency portions, and the first RF band contains a first existing service RF range in a selected one of the high and low frequency portions of the first RF band, and the second RF band contains a second existing service RF range in a selected one of the high and low frequency portions of the second RF band, the receiver comprising:

a mixer for converting the RF signal into an intermediate frequency (IF) signal, using a single local oscillator frequency "f" produced from a single local oscillator;

an IF bandpass filter for canceling out frequencies of the IF signal outside of a predetermined passband of the IF bandpass filter; and an analog-to-digital (A/D) converter for converting the IF signal which has passed through the IF bandpass filter, into a Low-IF signal produced by simultaneous sampling of the IF signal at a single sampling frequency, wherein the IF signal contains a first IF band corresponding to the first RF band, and a second IF band corresponding to the second RF band, the first IF band contains a first existing service IF range corresponding to the first existing service RF range, and the second IF band contains a second existing service IF range corresponding to the second existing service RF range, the program comprising:

instructions for selecting an arbitrary point located between the first and second RF bands as an initial local-oscillator-frequency "$f_0$;"

instructions for moving the local oscillator frequency "$f_0$" from the initial local-oscillator-frequency "$f_0$" by an amount $\Delta f$ for allowing the first and second existing service IF ranges to lie outside of the predetermined passband of the IF bandpass filter; and instructions for indicating a final value of the local oscillator frequency "f" to the local oscillator.

The "computer-readable medium" may be realized in any one of a variety of types, including, although not limited to, a magnetic recording medium, such as a flexible-disc, an optical recording medium, such as a CD and a CD-ROM, an optical-magnetic recording medium, such as an MO, an unremovable storage, such as a ROM, for example.

Illustrative Embodiments

According to the invention, the following modes are provided as illustrative embodiments of the invention.

According to a first mode of the invention, there is provided the receiver according to the first aspect, wherein the first and second existing service RF ranges lie in the first and second RF bands on a same side with respect to center frequencies of the first and second RF bands, respectively.

According to a second mode of the invention, there is provided the receiver according to the first aspect or the first mode, further comprising a processor for selecting an arbitrary point located between the first and second RF bands as an initial local-oscillator-frequency "$f_0$," for moving the local oscillator frequency "f" from the initial local-oscillator-frequency "$f_0$" by an amount $\Delta f$ for allowing the first and second existing service IF ranges to lie outside of the predetermined passband of the IF bandpass filter, and for indicating a final value of the local oscillator frequency "f" to the local oscillator.

According to a third mode of the invention, there is provided the receiver according to the first aspect, the first mode or the second mode, wherein the A/D converter performs undersampling for the IF signal.

According to a fourth mode of the invention, there is provided the receiver according to any one of the first aspect and the first through third modes, wherein the IF bandpass filter is a single IF bandpass filter common to the first and second IF bands, and the predetermined passband of the single IF bandpass filter is common to the first and second IF bands.

According to a fifth mode of the invention, there is provided the receiver according to the fourth mode, wherein the local oscillator frequency "f" is determined to prevent interference, on a frequency axis, between a frequency portion of the first IF band exclusive of the first existing service IF range, and a frequency portion of the second IF band exclusive of the second existing service IF range, within the predetermined passband of the IF bandpass filter.

According to a sixth mode of the invention, there is provided the receiver according to any one of the first aspect and the first through third modes, wherein the IF signal includes two orthogonal signal components, the mixer includes first and second mixers for the two orthogonal signal components, respectively, the IF bandpass filter includes first and second IF bandpass filters for the two orthogonal signal components, respectively, and the A/D converter includes first and second A/D converters for the two orthogonal signal components, respectively.

According to a seventh mode of the invention, there is provided the receiver according to the sixth mode, wherein the first and second IF bandpass filters share a common passband, and the local oscillator frequency "f" is determined to allow a frequency portion of the first IF band exclusive of the first existing service IF range and a frequency portion of the second IF band exclusive of the second existing service IF range to overlap with each other on a frequency axis, within the predetermined passbands of the first and second IF bandpass filters, respectively.

According to an eighth mode of the invention, there is provided the receiver according to any one of the first aspect and the first through seventh modes, wherein the IF bandpass filter is in the form of a notch filter having a predetermined stopband, and the local oscillator frequency "f" is determined to allow the first and second existing service IF ranges to lie in the predetermined stopband of the notch filter.

According to a ninth mode of the invention, there is provided the method according to the second aspect, wherein the first and second existing service RF ranges lie in the first and second RF bands on a same side with respect to center frequencies of the first and second RF bands, respectively.

According to a tenth mode of the invention, there is provided the method according to the second aspect or the ninth mode, further comprising the steps of:

selecting an arbitrary point located between the first and second RF bands as an initial local-oscillator-frequency "$f_0$;"

moving the local oscillator frequency "f" from the initial local-oscillator-frequency "$f_0$" by an amount $\Delta f$ for allowing the first and second existing service IF ranges to lie outside of the predetermined passband of the IF bandpass filter; and indicating a final value of the local oscillator frequency "f" to the local oscillator.

Several presently preferred embodiments of the invention will be described in detail by reference to the drawings in which like numerals are used to indicate like elements throughout.

First Exemplary Embodiment

Referring first to FIG. 3 and FIGS. 4(a)-4(d), a receiver 1 will be described in detail, which is constructed according to a first exemplary embodiment of the first aspect of the present invention.

Figure 3:
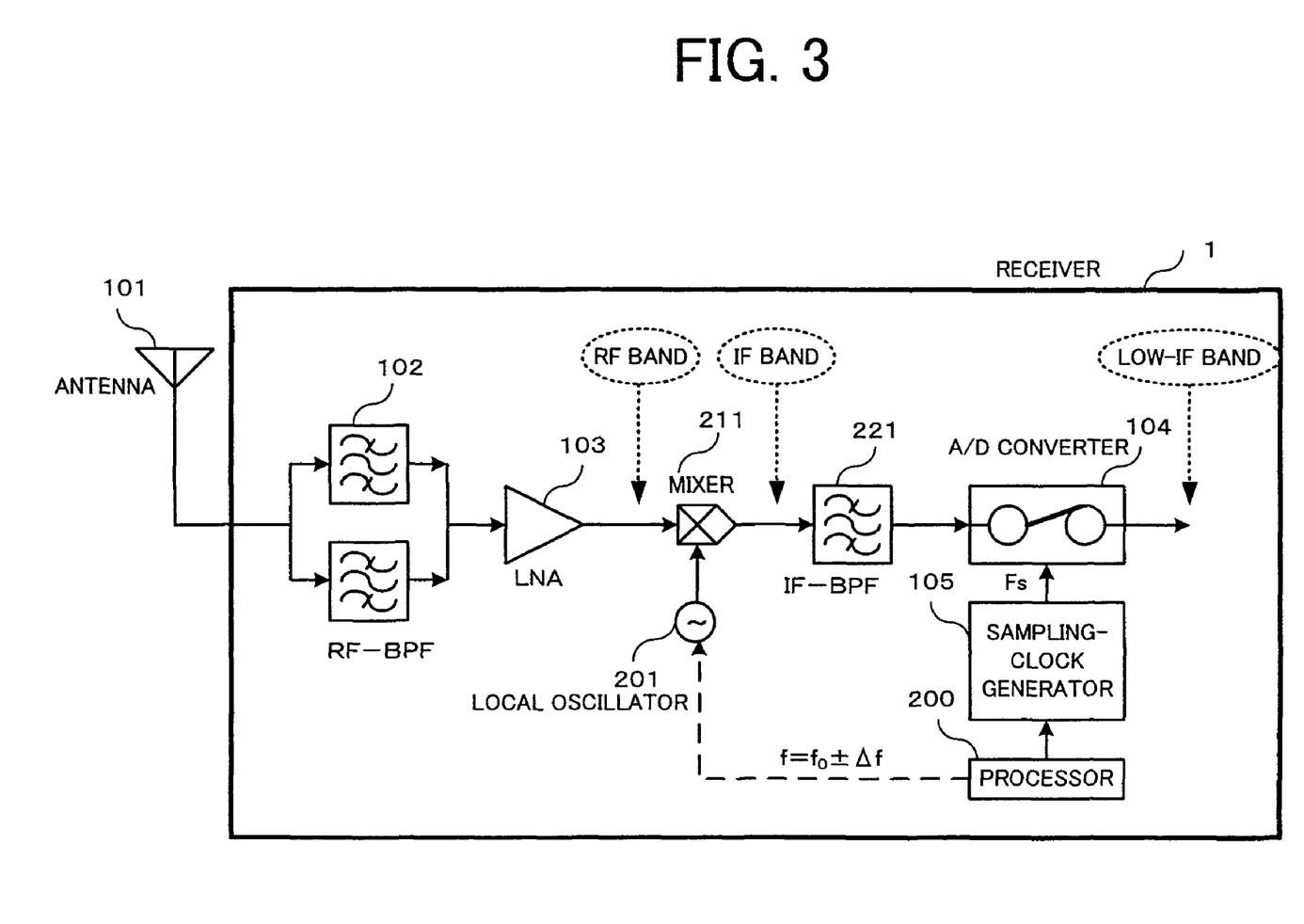
FIG. 3 is a functional block diagram illustrative of a multiband RF receiver constructed according to a first exemplary embodiment of the present invention.

The receiver 1 operates by implementing a method according to a first exemplary embodiment of the second aspect of the present invention. The receiver 1 includes a processor 200 to execute a program to implement the method, and also includes a computer-readable medium (not shown) which has stored therein the program. The medium constitutes an example of a computer-readable medium in accordance with a first exemplary embodiment of the third aspect of the present invention.

The purpose of the receiver 1 may be, for example, but limited to a receiver for a mobile or cellular phone.

The receiver 1 is designed to operate successfully, when receiving a multiband RF (Radio Frequency) signal which contains system bands (i.e., frequency bands) within which respective existing service ranges (i.e., frequency ranges) lie in low frequency portions.

An alternative receiver will be described later with reference to FIGS. 5(a)-5(d), which is designed to operate successfully, when receiving a multiband RF signal which contains system bands within which respective existing service ranges lie in high frequency portions. This receiver is constructed according to a third exemplary embodiment of the first aspect of the present invention.

FIG. 3 is a functional block diagram illustrative of the receiver 1. FIGS. 4(a)-4(d) are wave form charts for explanation of frequency conversion performed in the receiver 1 when receiving a multiband RF signal which contains existing service ranges within the respective system bands, in low frequency portions thereof, as illustrated in FIG. 4(a).

In addition, FIG. 4(e) is a wave form chart for explanation of frequency conversion performed in a receiver according to a second exemplary embodiment of the first aspect of the present invention.

As illustrated in FIG. 3, the receiver 1 is provided with an antenna 101. The receiver 1 receives at the antenna 101 an RF signal which contains two distinct RF bands.

To this end, the antenna 101 is made to be capable of receiving a signal having a relatively wide range of frequencies. In an example, the antenna 101 is required to receive a signal having an adequately wide range of frequencies, for simultaneous reception of a first RF band at 800 MHz, and a second RF band at 2 GHz, for example.

Of course, the antenna 101 is not always required to be a single unit, but may be alternatively a plurality of units which are provided on an RF-band by RF-band basis.

As illustrated in FIG. 3, the RF signal, after received at the antenna 101, is then delivered, in duplicate signals, to two RF bandpass filters 102 and 102 provided for distinct system bands. The RF bandpass filters 102 and 102 operate to remove undesired frequency components from the received signals, respectively.

Figure 4:
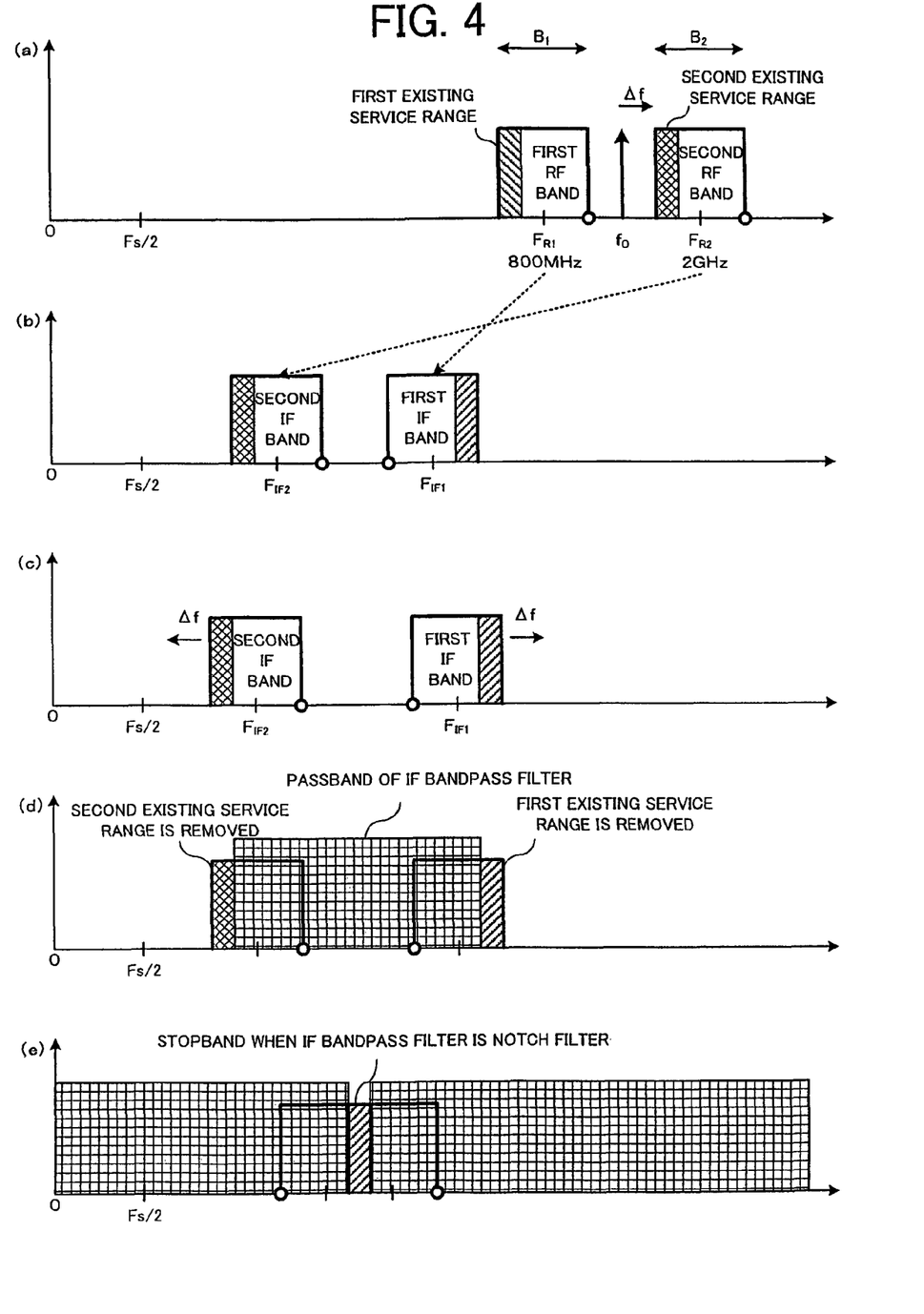
FIGS. 4(a) through 4(d) are wave form charts for explanation of frequency conversion performed in the receiver depicted in FIG. 3.
FIG. 4(e) is a wave form chart for explanation of frequency conversion performed in a multiband RF receiver constructed according to a second exemplary embodiment of the present invention.

FIG. 4 (a) illustrates the frequency components of the first and second RF bands outputted from the RF bandpass filters 102 and 102, respectively.

As illustrated in FIG. 4(a), a first existing service range within the first RF band at 800 MHz (e.g., for mobile phones) and a second existing service range within the second RF band at 2 GHz (e.g., for wireless LAN or WiMAX) lie in low frequency portions of the respective RF bands.

Various symbols used in FIG. 4 denote as follows:
$F_{R1}$: the center frequency of the first RF band;
$B_1$: the bandwidth of the first RF band;
$F_{R2}$: the center frequency of the second RF band (in the example of FIG. 4, $F_{R1} < F_{R2}$); and
$B_2$: the bandwidth of the second RF band.

As illustrated in FIG. 3, RF signals, after outputted from the two RF bandpass filters 102 and 102, respectively, are combined into a composite RF signal, and then the composite RF signal is amplified by a Low Noise Amplifier (LNA) 103. The LNA 103 is capable of amplifying a signal which has a relatively wide range of frequencies, in order to amplify even the RF signal containing the first and second RF bands.

Of course, the LNA 103 may be alternatively a plurality of units which are provided on an RF-band by RF-band basis.

The RF signal, after amplified by the LNA 103, is delivered to a mixer (i.e., a multiplier) 211 having the function of frequency conversion.

The mixer 211 operates to convert the first and second RF bands into first and second IF (Intermediate Frequency) bands, respectively, based on a local oscillator frequency "f" (in the form of a sinusoidal wave) outputted from a single local oscillator 201.

An IF signal outputted from the mixer 211 contains a signal having frequency components equal in frequency to the sum of and the difference between the center frequency of the first RF band "$F_{R1}$" and the local oscillator frequency "f," and a signal having frequency components equal in frequency to the sum of and the difference between the center frequency of the second RF band "$F_{R2}$" and the local oscillator frequency "f."

In an example where, for the local oscillator frequency "f," $f=(F_{R1}+F_{R2})/2$, the first IF band outputted from the mixer 211 has a range of frequencies between $(F_{R1}+f)$ and $(f-F_{R1})$, while the second IF band has a range of frequencies between $(F_{R2}+f)$ and $(f-F_{R2})$.

The IF signal outputted from the mixer 211 is outputted into a single IF bandpass filter 221.

The IF bandpass filter 211 is configured to cancel out portions of the frequency components of the IF signal which are outside of a predetermined passband (i.e., a fixed passband, in this embodiment).

The frequency ranges to be canceled out include a plurality of existing service ranges (i.e., used frequency ranges) within a plurality of system bands. This signal processing will be described in detail later.

In this embodiment, a plurality of frequency ranges can be used in combination which constitute portions of a plurality of system bands that are outside of a plurality of existing service ranges (e.g., a plurality of unused frequency ranges which are neighbors without overlapping).

In this embodiment illustrated in FIG. 3, the width of the passband of the IF bandpass filter 221 is equal to, for example, the sum $(B_1+B_2)$ of the bandwidth of the first RF band $B_1$ and the bandwidth of the second RF band $B_2$.

It is added that selection of an SAW (Surface Acoustic Wave) filter as the IF bandpass filter 221 would result in a sharp-cutoff characteristic.

The IF signal which has passed through the IF bandpass filter 221 is outputted to an A/D (analog-to-digital) converter 104.

The A/D converter 104 is configured to simultaneously sample the IF signal which has passed through the IF bandpass filter 221, at a single sampling frequency "$F_s$," to thereby produce and output a baseband signal. The single sampling frequency "$F_s$" is generated from a sampling-clock generator 105.

The single sampling frequency "$F_s$" is selected by the direction of the processor (i.e., a CPU) 200 so as to successfully prevent interference between spectral replicas of all desired signals (e.g., channel signals) within each system band. These replicas are produced by undersampling. As a result, the A/D converter 104 outputs a low intermediate frequency (Low-IF) signal.

In this embodiment, the A/D converter 104 performs frequency conversion by undersampling, but, of course, may alternatively perform frequency conversion by oversampling.

The processor 200 provides a direction of the local oscillator frequency "f" to the local oscillator 201.

Describing now the operation of the processor 200, the processor 200 initially sets an arbitrary point (e.g., the midpoint) between the first RF band (known) and the second RF band (known), as an initial local oscillator frequency "$f_0$."

FIG. 4(b) illustrates the first and second IF bands which are produced as a result of frequency conversion of the first and second RF bands based on the initial local oscillator frequency "$f_0$." The first IF band is a mirror image of the first RF band illustrated in FIG. 4(a), while the second IF band is not a mirror image of the second RF band illustrated in FIG. 4(a).

As is well-known, the spectrum of the sampled signal can be obtained by making a plurality of replicas of the spectrum of the original signal at multiples of a sampling frequency "$F_s$." Each replica is either an unreflected image or a mirror image (i.e., a reflected image) of the original signal.

Which one of the first and second IF bands becomes a mirror image of a corresponding one of the first and second RF bands, depends on the relation between the sampling frequency "$F_s$" and the center frequency "$F_c$" of the two system bands. This is disclosed in, for example, Japanese Patent Application Publication No. 2009-49727, the disclosure of which is herein incorporated by reference in its entirety.

Next, the processor 200, as illustrated in FIG. 4(d), moves the local oscillator frequency "f" from the initial local-oscillator-frequency "$f_0$" by an amount of Δf large enough to allow the first existing service range in the first IF band and the second existing service range in the second IF band to lie outside the predetermined passband of the IF bandpass filter 221.

An increase in the local oscillator frequency "f" from the initial local-oscillator-frequency "$f_0$" by an amount of Δf, as illustrated in FIG. 4(a), allows the first and second IF bands to move away from each other, as illustrated in FIG. 4(c).

As illustrated in FIG. 4(c), the first and second IF bands are neighboring replicas without overlapping, so as to face each other at their respective portions exclusive of their respective existing service ranges.

The processor 200, as illustrated in FIG. 4(d), moves the local oscillator frequency "f" from the initial local-oscillator-frequency "$f_0$" by an amount of Δf large enough to avoid interference, on the frequency axis, between a portion of the first IF band which is outside of the first existing service range, and a portion of the second IF band which is outside of the second existing service range, within the predetermined passband of the IF bandpass filter 221.

More specifically, the processor 200, as indicated in FIG. 4(d), continues increasing the local oscillator frequency "f" from the initial local-oscillator-frequency "$f_0$," until both the first and second existing service ranges go outside of the passband of the IF bandpass filter 221.

Finally, the processor 200 provides a direction that the local oscillator frequency f=$f_0$±Δf to the local oscillator 201.

Passing the IF signal including the above-described first and second IF bands through the IF bandpass filter 221 results in removal of the first and second existing service ranges.

For a signal which is arranged as illustrated in FIG. 4, the center frequency of the passband of the IF bandpass filter 221 is expressed as $(F_{R2}-F_{R1})/2+(B_1-B_2)/4$, and the width of the passband is equal to $(B_1+B_2)$.

The local oscillator frequency "f" is expressed as f=$f_0$+Δf, provided that $f_0=(F_{R2}+F_{R1})/2+(B_1+B_2)/4$, where, $$\Delta f=Max(B_1,B_2),$$

where,

Min(a, b): the function for selecting a smaller one of "a" and "b," and

Max(a, b): the function for selecting a greater one of "a" and "b."

It is noted that this value of "Δf" is merely an example value and may be adjusted depending on the relationship between the received signal and the signals of the existing service ranges.

It is further noted that, in this embodiment, the processor 200 is configured to calculate an optimal value of "Δf" and thereafter calculate an optimal value of the local oscillator frequency "f" accordingly, and is further configured to provide the optical value of the local oscillator frequency "f" to the local oscillator 201.

Therefore, this embodiment allows, when the received signal is variable in characteristic over time, an optimal value of the local oscillator frequency "f" to be calculated as a variable value depending on the time-varying characteristics of the received signal.

In contrast, when the received signal is fixed in characteristic over time, the local oscillator 201 may be alternatively configured to generate an optimal value of the local oscillator frequency "f" as a pre-fixed local oscillator frequency "f," without reliance on a direction from the processor 200.

Second Exemplary Embodiment

Referring next to FIG. 4(e), a receiver 1 will be described which is constructed according to a second exemplary embodiment of the first aspect of the present invention.

The present embodiment, however, shares so many common elements with the receiver 1 according to the first exemplary embodiment that the present embodiment will be described in greater detail only with respect to elements different from the first exemplary embodiment, while the common elements will be omitted in detailed description by reference using the identical reference numerals or names, without redundant explanation of these common elements.

In the first exemplary embodiment, the IF bandpass filter 221 is configured to pass frequency components only within a specified band (i.e., the predetermined passband), and block frequency components within lower and higher bands than the specified band.

Alternatively, in this embodiment, the IF bandpass filter 221 is in the form of a notch filter. This notch filter is configured to block frequency components only within a specified band (i.e., a predetermined stopband), and pass frequency components within lower and higher bands than the specified band.

In this instance, the processor 200 determines a frequency change Δf of a local oscillator frequency "f" so that the frequency change Δf can have an amount large enough to allow the first existing service range in the first IF band and the second existing service range in the second IF band to lie in the predetermined stopband of the notch filter.

In this regard, interference on the frequency axis may be allowed between the first existing service range in the first IF band and the second existing service range in the second IF band.

As illustrated in FIG. 4(e), the processor 200 determines the frequency change Δf so that the first and second existing service ranges can lie in the predetermined stopband of the notch filter.

The stopband of the notch filter is selected to be $(F_{R2}-F_{R1})/2+(B_1-B_2)/4$.

In this regard, an initial value of the local oscillator frequency "$f_0$" is, $$f_0=(F_{R1}-B_1/2)/2+(F_{R2}-B_2/2)/2,$$

a final value of the local oscillator frequency "f" is, $f = f_0 + \Delta f$, and the frequency change "$\Delta f$" is, $\Delta f = \text{Max}(B_1, B_2)/2$.

Third Exemplary Embodiment

Referring next to FIGS. 5(a)-5(d), a receiver 1 will be described which is constructed according to a third exemplary embodiment of the first aspect of the present invention.

The present embodiment, however, shares so many common elements with the receiver 1 according to the first exemplary embodiment that the present embodiment will be described in greater detail only with respect to elements different from the first exemplary embodiment, while the common elements will be omitted in detailed description by reference using the identical reference numerals or names, without redundant explanation of these common elements.

The receiver 1 according to this embodiment is designed to operate successfully, when receiving a multiband RF signal which contains system bands within which respective existing service ranges lie in high frequency portions.

Figure 5:
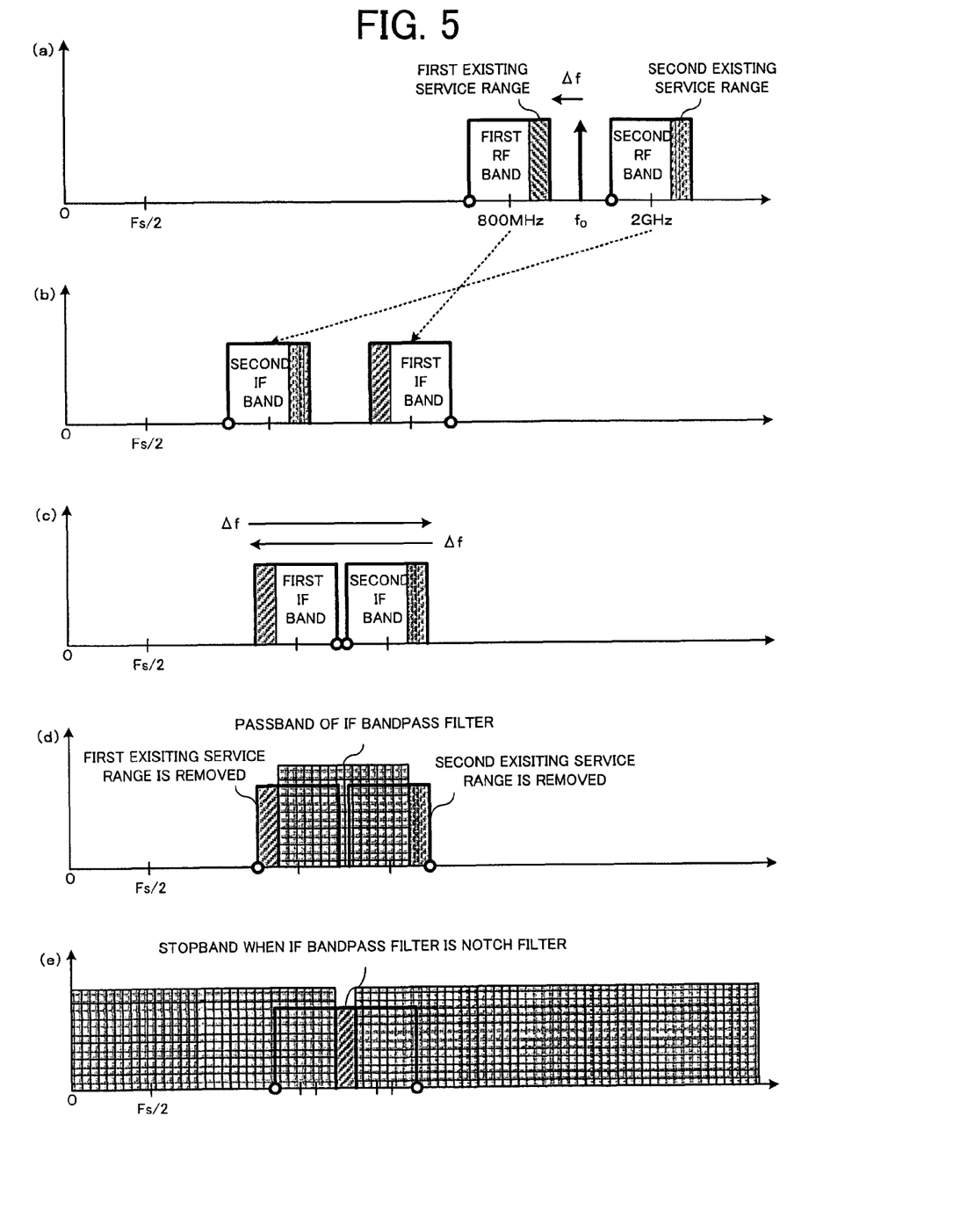
FIGS. 5(a) through 5(d) are wave form charts for explanation of frequency conversion performed in a multiband RF receiver constructed according to a third exemplary embodiment of the present invention.
FIG. 5(e) is a wave form chart for explanation of frequency conversion performed in a multiband RF receiver constructed according to a fourth exemplary embodiment of the present invention.

FIG. 5 (a) illustrates the frequency components of two RF bands outputted from the RF bandpass filters 102 and 102, respectively. As illustrated in FIG. 5(a), a first existing service range within a first RF band (at 800 MHz) and a second existing service range within a second RF band (at 2 GHz) lie in high frequency portions of the respective RF bands.

The processor 200 moves the local oscillator frequency "f" from the initial local-oscillator-frequency "$f_0$" by an amount of $\Delta f$ large enough to allow the first existing service range in the first IF band and the second existing service range in the second IF band to lie outside the predetermined passband of the IF bandpass filter 221.

A decrease in the local oscillator frequency "f" from the initial local-oscillator-frequency "$f_0$" by an amount of $\Delta f$, as illustrated in FIG. 5(a), allows the first and second IF bands to move toward each other and then move away from each other, as illustrated in FIG. 5(c).

As illustrated in FIG. 5(c), the first and second IF bands are neighboring replicas without overlapping, so as to face each other at their respective portions exclusive of their respective existing service ranges.

The processor 200 moves the local oscillator frequency "f" from the initial local-oscillator-frequency "$f_0$" by an amount of $\Delta f$ large enough to avoid interference, on the frequency axis, between a portion of the first IF band which is outside of the first existing service range, and a portion of the second IF band which is outside of the second existing service range, within the predetermined passband of the IF bandpass filter 221.

More specifically, the processor 200, as indicated in FIG. 5(d), continues decreasing the local oscillator frequency "f" from the initial local-oscillator-frequency "$f_0$," until both the first and second existing service ranges go outside of the passband of the IF bandpass filter 221.

Finally, the processor 200 provides a direction that the local oscillator frequency $f = f_0 \pm \Delta f$ to the local oscillator 201.

Passing the IF signal including the above-described first and second IF bands through the IF bandpass filter 221 results in removal of the first and second existing service ranges.

Fourth Exemplary Embodiment

Referring next to FIG. 5(e), a receiver 1 will be described which is constructed according to a fourth exemplary embodiment of the first aspect of the present invention.

The present embodiment, however, shares so many common elements with the receiver 1 which has been described with reference to FIG. 4(e) and which is constructed according to the second exemplary embodiment, that the present embodiment will be described in greater detail only with respect to elements different from the second exemplary embodiment, while the common elements will be omitted in detailed description by reference using the identical reference numerals or names, without redundant explanation of these common elements.

It is noted that the correspondence between this embodiment and the third exemplary embodiment is in common to that between the second exemplary embodiment and the first exemplary embodiment.

In this embodiment, like in the second exemplary embodiment, the IF bandpass filter 221 is in the form of a notch filter. This notch filter is configured to block frequency components only within a specified band (i.e., a predetermined stopband), and pass frequency components within lower and higher bands than the specified band.

In this embodiment, like in the second exemplary embodiment, the processor 200 determines a frequency change $\Delta f$ of a local oscillator frequency "f" so that the frequency change $\Delta f$ can have an amount large enough to allow the first existing service range in the first IF band and the second existing service range in the second IF band to lie in the predetermined stopband of the notch filter.

As illustrated in FIG. 5(e), the processor 200 determines the frequency change $\Delta f$ so that the first and second existing service ranges can lie in the predetermined stopband of the notch filter.

Fifth Exemplary Embodiment

Referring next to FIG. 6 and FIGS. 7(a)-7(d), a receiver 1 will be described which is constructed according to a fifth exemplary embodiment of the first aspect of the present invention.

The present embodiment, however, shares so many common elements with the receiver 1 according to the first exemplary embodiment that the present embodiment will be described in greater detail only with respect to elements different from the first exemplary embodiment, while the common elements will be omitted in detailed description by reference using the identical reference numerals or names, without redundant explanation of these common elements.

Figure 6:
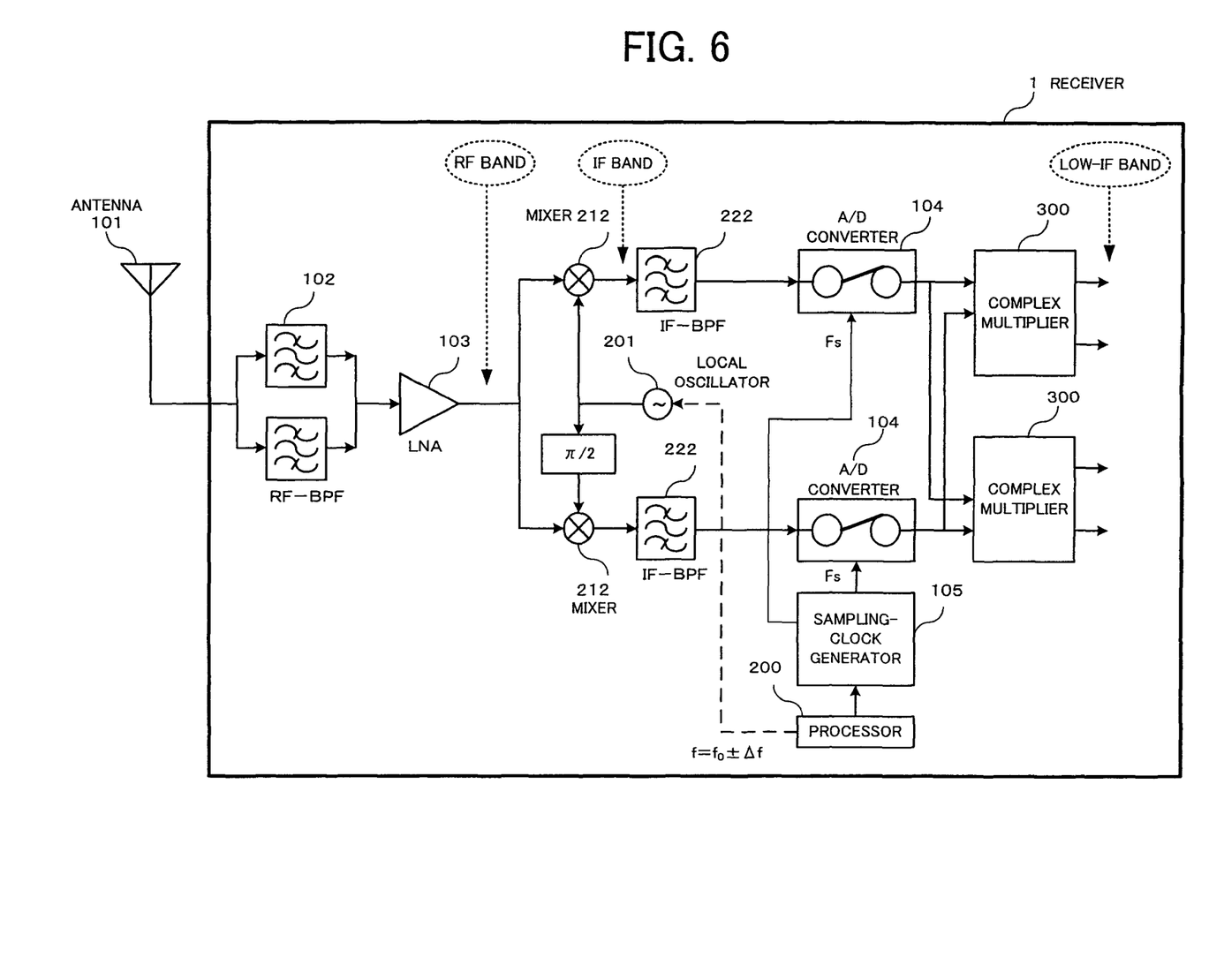
FIG. 6 is a functional block diagram illustrative of a multiband RF receiver constructed according to a fifth exemplary embodiment of the present invention.

FIG. 6 is a functional block diagram illustrative of the receiver 1 according to this embodiment. FIGS. 7(a)-7(d) are wave form charts for explanation of frequency conversion performed in the receiver 1 when receiving a multiband RF signal which contains existing service ranges within the respective system bands, in high frequency portions thereof, as illustrated in FIG. 7(a).

In this embodiment, unlike in the first exemplary embodiment, each of the RF signal and the IF signal has two orthogonal signal components.

For this reason, in this embodiment, unlike in the first exemplary embodiment, a set of a mixer 212, an IF bandpass filter 222, and the A/D converter 104 and another set of these are provided for diagonal RF signals, respectively, and for diagonal IF signals, respectively.

In this embodiment, first and second RF bands illustrated in FIG. 7(a) are frequency-converted based on the initial local-oscillator-frequency "$f_0$" into first and second IF bands illustrated in FIG. 7(b).

A decrease in the local oscillator frequency "f" from the initial local-oscillator-frequency "$f_0$" by an amount of $\Delta f$, as illustrated in FIG. 7(a), allows the first and second IF bands to move away from each other, as illustrated in FIG. 7(c).

The local oscillator frequency "f" is moved from the initial local-oscillator-frequency "$f_0$" so that the first existing service range in the first IF band can lie outside of a predetermined passband of a corresponding one of the IF bandpass filters 222 and 222, and so that the second existing service range in the second IF band can lie outside of a predetermined passband of the other IF bandpass filter 222.

In this regard, interference on the frequency axis may be allowed between a portion of the first IF band outside of the first existing service range and a portion of the second IF band outside of the second existing service range.

Figure 7:
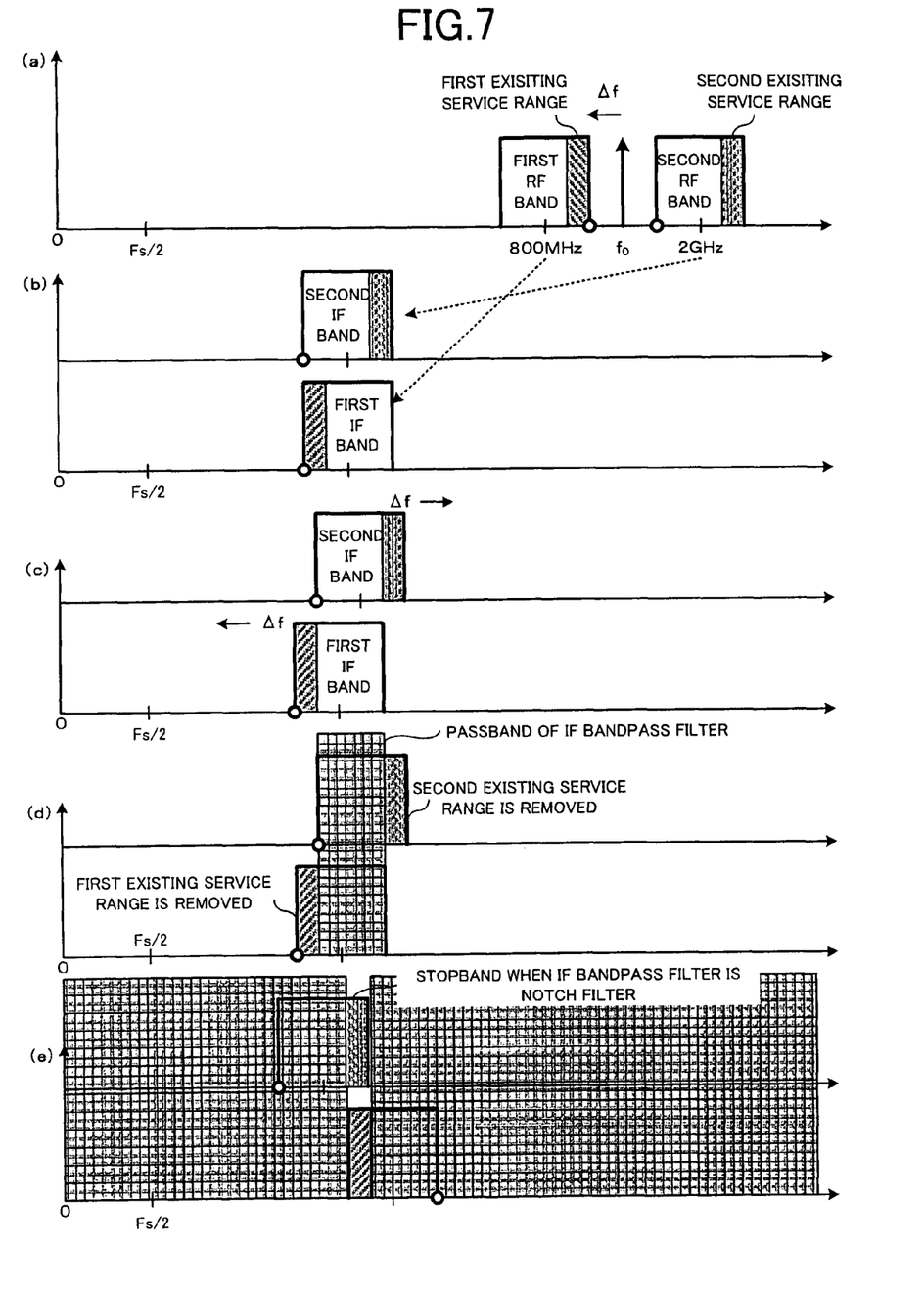
FIGS. 7(a) through 7(d) are wave form charts for explanation of frequency conversion performed in the receiver depicted in FIG. 6.
FIG. 7(e) is a wave form chart for explanation of frequency conversion performed in a multiband RF receiver constructed according to a sixth exemplary embodiment of the present invention.

For a signal which is arranged as illustrated in FIG. 7, the center frequency of the common passband to the IF bandpass filters 222 and 222 varies depending on which one is larger between the bandwidths "$B_1$" and "$B_2$."

More specifically, when $B_1 > B_2$,
an initial value of the local oscillator frequency "$f_0$" is, $$f_0 = (F_{R1} + B_1/2)/2 + (F_{R2} - B_2/2)/2, \text{ and}$$

the passband of each IF bandpass filter 222 is as follows:
center frequency: $(F_{R2} - B_2/2)/2 - (F_{R1} + B_1/2)/2 + B_1/2$, and
bandwidth: $B_1$.
In contrast, when $B_1 < B_2$,
an initial value of the local oscillator frequency "$f_0$" is, $$f_0 = (F_{R1} + B_1/2)/2 + (F_{R2} - B_2/2)/2, \text{ and}$$

the passband of each IF bandpass filter 222 is as follows:
center frequency: $(F_{R2} + B_2/2)/2 - (F_{R1} - B_1/2)/2 - B_2/2$, and
bandwidth: $B_2$.
In this regard,
a final value of the local oscillator frequency "f" is, $$f = f_0 + \Delta f, \text{ and}$$

the frequency change "$\Delta f$" is, $$\Delta f = \text{Max}(B_1, B_2).$$

As illustrated in FIG. 6, signals output from those two A/D converters 104 and 104 are delivered to two complex multipliers 300 and 300 for performing predetermined signal processing for the received signals.

Sixth Exemplary Embodiment

Referring next to FIG. 7(e), a receiver 1 will be described which is constructed according to a sixth exemplary embodiment of the first aspect of the present invention.

The present embodiment, however, shares so many common elements with the receiver 1 which has been described with reference to FIG. 4(e) and which is constructed according to the second exemplary embodiment that the present embodiment will be described in greater detail only with respect to elements different from the second exemplary embodiment, while the common elements will be omitted in detailed description by reference using the identical reference numerals or names, without redundant explanation of these common elements.

It is noted that the correspondence between this embodiment and the fifth exemplary embodiment is in common to that between the second exemplary embodiment and the first exemplary embodiment.

In this embodiment, like in the second exemplary embodiment, those two IF bandpass filters 222 and 222 is in the form of notch filters. Each notch filter is configured to block frequency components only within a specified band (i.e., a predetermined stopband), and pass frequency components within lower and higher bands than the specified band.

In this embodiment, the processor 200 determines a frequency change Δf of a local oscillator frequency "f" so that the first existing service range in the first IF band can lie outside of the predetermined stopband of a corresponding one of the notch filters, and so that the second existing service range in the second IF band can lie outside of the predetermined passband of the other notch filter.

As illustrated in FIG. 7(e), the frequency change Δf is determined so that the first and second existing service ranges can lie in the predetermined stopband common to these two notch filters.

As will be easily understood from the above explanation, some embodiments described above would provide some advantageous effects.

For example, when a plurality of existing system bands contain respective existing service ranges together with respective remaining ranges, that is, respective unused frequency ranges, these embodiments would allow simultaneous reception of these unused frequency ranges in combination, without causing undesired interference between these ranges.

Additionally, these embodiments would allow simultaneous sampling of two bands different in frequency from each other, which facilitates downsizing of the receiver 1.

Still additionally, these embodiments would eliminate, even when the same system band contains a plurality of existing service ranges, undesired interference therebetween.

Further, except that the local oscillator frequency "f" of the local oscillator 201 can be changed by the direction from the processor 200, the IF bandpass filters 221 and 222 are each fixed in passband. Therefore, these embodiments would make it easier to design the receiver 1.

Notably, the first through fourth embodiments, in which the mixer 211 and the IF bandpass filter 221 are each provided in common to different system bands, would make it unnecessary to provide each of the mixer 211 and the IF bandpass filter 221 on a system-band by system-band basis. This makes a contribution to the reduction in the number of parts within the circuitry.

Nowadays, as mobile telecommunications systems, CDMA2000 1x and CDMA2000 1xEV-DO are widely used. In contrast, in the near future, as 3.9G wireless communications systems, LTE (Long Term Evolution) and UMB (Ultra Mobile Broadband) are expected to become widely used.

The receiver 1 according to any one of the embodiments described above would allow simultaneous reception of different wireless communications, for example, CDMA2000 1xEV-DO and UMB.

For 4G wireless communications systems, a transmission frequency band having a maximum width of 100 MHz is expected to be used. In some cases, however, such a continuous wide frequency band is difficult to be acquired, because of the allocation of frequencies.

In these cases, it is proposed to simultaneously use a plurality of unused channels of a plurality of frequency bands which have been allocated to such as cellular communications systems, wherein these channels are not used by existing system bands, to thereby achieve wideband communications.

The receiver 1 according to any one of the embodiments described above may be applied to communication environments using such system bands.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A receiver for receiving through at least one antenna a multiband radio frequency (RF) signal having first and second RF bands which are distinct, wherein the first RF band contains high and low frequency portions which are adjacent to each other on a frequency axis, and the second RF band contains high and low frequency portions which are adjacent to each other on a frequency axis, and the first RF band contains a first existing service RF range in a selected one of the high and low frequency portions of the first RF band, and the second RF band contains a second existing service RF range in a selected one of the high and low frequency portions of the second RF band, the receiver comprising:

a mixer for converting the RF signal into an intermediate frequency (IF) signal, using a single local oscillator frequency "f" produced from a single local oscillator, the single local oscillator frequency "f" being in common to the first and second RF bands;

an IF bandpass filter for canceling out frequencies of the IF signal outside of a predetermined passband of the IF bandpass filter; and an analog-to-digital (A/D) converter for converting the IF signal which has passed through the IF bandpass filter, into a Low-IF signal produced by simultaneous sampling of the IF signal at a single sampling frequency, wherein the IF signal contains a first IF band corresponding to the first RF band, and a second IF band corresponding to the second RF band, the first IF band contains a first existing service IF range corresponding to the first existing service RF range, the second IF band contains a second existing service IF range corresponding to the second existing service RF range, and the local oscillator frequency "f" is determined based on a center frequency and a bandwidth of the first RF band and a center frequency and a bandwidth of the second RF band, to allow the first and second existing service IF ranges to lie outside of the predetermined passband of the IF bandpass filter, and to allow a first unused frequency portion of the first IF band which is exclusive of the first existing service IF range and a second unused frequency portion of the second IF band which is exclusive of the second existing service IF range to lie within the predetermined passband of the IF bandpass filter, to thereby allow the IF passband filter to remove the first and second existing service IF bands from the first and second IF bands, respectively, to extract the first and second unused frequency portions from the first and second IF bands, respectively.

2. The receiver according to claim 1, wherein the first and second existing service RF ranges lie in the first and second RF bands on a same side with respect to center frequencies of the first and second RF bands, respectively.

3. The receiver according to claim 1, further comprising a processor for selecting an arbitrary point located between the first and second RF bands as an initial local-oscillator-frequency "$f_0$," for moving the local oscillator frequency "f" from the initial local-oscillator-frequency "$f_0$" by an amount $\Delta f$ for allowing the first and second existing service IF ranges to lie outside of the predetermined passband of the IF bandpass filter, and for indicating a final value of the local oscillator frequency "f" to the local oscillator.

4. The receiver according to claim 1, wherein the A/D converter performs undersampling for the IF signal.

5. The receiver according to claim 1, wherein the IF bandpass filter is a single IF bandpass filter common to the first and second IF bands, and the predetermined passband of the single IF bandpass filter is common to the first and second IF bands.

6. The receiver according to claim 1, wherein the IF signal includes two orthogonal signal components, the mixer includes first and second mixers for the two orthogonal signal components, respectively, the IF bandpass filter includes first and second IF bandpass filters for the two orthogonal signal components, respectively, and the A/D converter includes first and second A/D converters for the two orthogonal signal components, respectively.

7. The receiver according to claim 1, wherein the IF bandpass filter is in the form of a notch filter having a predetermined stopband, and the local oscillator frequency "f" is determined to allow the first and second existing service IF ranges to lie in the predetermined stopband of the notch filter.

8. A method for converting frequencies of a multiband radio frequency (RF) signal having first and second RF bands which are distinct, operable in a receiver for receiving the RF signal through at least one antenna, wherein the first RF band contains high and low frequency portions which are adjacent to each other on a frequency axis, and the second RF band contains high and low frequency portions which are adjacent to each other on a frequency axis, and the first RF band contains a first existing service RF range in a selected one of the high and low frequency portions of the first RF band, and the second RF band contains a second existing service RF range in a selected one of the high and low frequency portions of the second RF band, the method comprising the steps of:

converting the RF signal into an intermediate frequency (IF) signal, using a single local oscillator frequency "f" produced from a single local oscillator, the single local oscillator frequency "f" being in common to the first and second RF bands;

canceling out frequencies of the IF signal outside of a predetermined passband of an IF bandpass filter; and converting the IF signal which has passed through the IF bandpass filter, into a Low-IF signal produced by simultaneous sampling of the IF signal at a single sampling frequency, wherein the IF signal contains a first IF band corresponding to the first RF band, and a second IF band corresponding to the second RF band, the first IF band contains a first existing service IF range corresponding to the first existing service RF range, the second IF band contains a second existing service IF range corresponding to the second existing service RF range, and the local oscillator frequency "f" is determined based on a center frequency and a bandwidth of the first RF band and a center frequency and a bandwidth of the second RF band, to allow the first and second existing service IF ranges to lie outside of the predetermined passband of the IF bandpass filter, and to allow a first unused frequency portion of the first IF band which is exclusive of the first existing service IF range and a second unused frequency portion of the second IF band which is exclusive of the second existing service IF range to lie within the predetermined passband of the IF bandpass filter, to thereby allow the IF passband filter to remove the first and second existing service IF bands from the first and second IF bands, respectively, to extract the first and second unused frequency portions from the first and second IF bands, respectively.

9. The method according to claim 8, wherein the first and second existing service RF ranges lie in the first and second RF bands on a same side with respect to center frequencies of the first and second RF bands, respectively.

10. The method according to claim 8, further comprising the steps of:
selecting an arbitrary point located between the first and second RF bands as an initial local-oscillator-frequency "$f_0$;"
moving the local oscillator frequency "f" from the initial local-oscillator-frequency "$f_0$" by an amount Δf for allowing the first and second existing service IF ranges to lie outside of the predetermined passband of the IF bandpass filter; and
indicating a final value of the local oscillator frequency "f" to the local oscillator.

11. A non-transitory computer-readable medium having stored therein a program which, when executed by a computer, controls a receiver for receiving through at least one antenna a multiband radio frequency (RF) signal having first and second RF bands which are distinct,
wherein the first RF band contains high and low frequency portions which are adjacent to each other on a frequency axis, and the second RF band contains high and low frequency portions which are adjacent to each other on a frequency axis, and
the first RF band contains a first existing service RF range in a selected one of the high and low frequency portions of the first RF band, and the second RF band contains a second existing service RF range in a selected one of the high and low frequency portions of the second RF band,
the receiver comprising:
a mixer for converting the RF signal into an intermediate frequency (IF) signal, using a single local oscillator frequency "f" produced from a single local oscillator, the single local oscillator frequency "f" being in common to the first and second RF bands;
an IF bandpass filter for canceling out frequencies of the IF signal outside of a predetermined passband of the IF bandpass filter; and
an analog-to-digital (A/D) converter for converting the IF signal which has passed through the IF bandpass filter, into a Low-IF signal produced by simultaneous sampling of the IF signal at a single sampling frequency,
wherein the IF signal contains a first IF band corresponding to the first RF band, and a second IF band corresponding to the second RF band,
the first IF band contains a first existing service IF range corresponding to the first existing service RF range, and
the second IF band contains a second existing service IF range corresponding to the second existing service RF range,
the program comprising:
instructions for selecting an arbitrary point located between the first and second RF bands as an initial local-oscillator-frequency "$f_0$;"
instructions for moving the local oscillator frequency "f" from the initial local-oscillator-frequency "$f_0$" by an amount Δf for allowing the first and second existing service IF ranges to lie outside of the predetermined passband of the IF bandpass filter, and for calculating the amount Δf based on a center frequency and a bandwidth of the first RF band and a center frequency and a bandwidth of the second RF band; and
instructions for indicating a final value of the local oscillator frequency "f" to the local oscillator.

12. A receiver for receiving through at least one antenna a multiband radio frequency (RF) signal having first and second RF bands which are distinct,
wherein the first RF band contains high and low frequency portions, and the second RF band contains high and low frequency portions, and
the first RF band contains a first existing service RF range in a selected one of the high and low frequency portions of the first RF band, and the second RF band contains a second existing service RF range in a selected one of the high and low frequency portions of the second RF band,
the receiver comprising:
a mixer for converting the RF signal into an intermediate frequency (IF) signal, using a single local oscillator frequency "f" produced from a single local oscillator;
an IF bandpass filter for canceling out frequencies of the IF signal outside of a predetermined passband of the IF bandpass filter; and
an analog-to-digital (A/D) converter for converting the IF signal which has passed through the IF bandpass filter, into a Low-IF signal produced by simultaneous sampling of the IF signal at a single sampling frequency,
wherein the IF signal contains a first IF band corresponding to the first RF band, and a second IF band corresponding to the second RF band,
the first IF band contains a first existing service IF range corresponding to the first existing service RF range,
the second IF band contains a second existing service IF range corresponding to the second existing service RF range,
the local oscillator frequency "f" is determined to allow the first and second existing service IF ranges to lie outside of the predetermined passband of the IF bandpass filter, and to allow a frequency portion of the first IF band exclusive of the first existing service IF range and a frequency portion of the second IF band exclusive of the second existing service IF range to lie within the predetermined passband of the IF bandpass filter,
the IF bandpass filter is a single IF bandpass filter common to the first and second IF bands,
the predetermined passband of the single IF bandpass filter is common to the first and second IF bands, and
the local oscillator frequency "f" is determined to prevent interference, on a frequency axis, between a frequency portion of the first IF band exclusive of the first existing service IF range, and a frequency portion of the second IF band exclusive of the second existing service IF range, within the predetermined passband of the IF bandpass filter.

13. A receiver for receiving through at least one antenna a multiband radio frequency (RF) signal having first and second RF bands which are distinct,
wherein the first RF band contains high and low frequency portions, and the second RF band contains high and low frequency portions, and
the first RF band contains a first existing service RF range in a selected one of the high and low frequency portions of the first RF band, and the second RF band contains a second existing service RF range in a selected one of the high and low frequency portions of the second RF band,
the receiver comprising:
a mixer for converting the RF signal into an intermediate frequency (IF) signal, using a single local oscillator frequency "f" produced from a single local oscillator;
an IF bandpass filter for canceling out frequencies of the IF signal outside of a predetermined passband of the IF bandpass filter; and
an analog-to-digital (A/D) converter for converting the IF signal which has passed through the IF bandpass filter, into a Low-IF signal produced by simultaneous sampling of the IF signal at a single sampling frequency,
wherein the IF signal contains a first IF band corresponding to the first RF band, and a second IF band corresponding to the second RF band,
the first IF band contains a first existing service IF range corresponding to the first existing service RF range,
the second IF band contains a second existing service IF range corresponding to the second existing service RF range,
the local oscillator frequency "f" is determined to allow the first and second existing service IF ranges to lie outside of the predetermined passband of the IF bandpass filter, and to allow a frequency portion of the first IF band exclusive of the first existing service IF range and a frequency portion of the second IF band exclusive of the second existing service IF range to lie within the predetermined passband of the IF bandpass filter,
the IF signal includes two orthogonal signal components,
the mixer includes first and second mixers for the two orthogonal signal components, respectively,
the IF bandpass filter includes first and second IF bandpass filters for the two orthogonal signal components, respectively,
the A/D converter includes first and second A/D converters for the two orthogonal signal components, respectively,
the first and second IF bandpass filters share a common passband, and
the local oscillator frequency "f" is determined to allow a frequency portion of the first IF band exclusive of the first existing service IF range and a frequency portion of the second IF band exclusive of the second existing service IF range to overlap with each other on a frequency axis, within the predetermined passbands of the first and second IF bandpass filters, respectively.

* * * * *